(12) United States Patent
Bastide et al.

(10) Patent No.: US 11,074,223 B2
(45) Date of Patent: Jul. 27, 2021

(54) ORPHANED CONTENT REMEDIATION

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Jonathan Dunne, Dungarvan (IE); Liam S. Harpur, Skerries (IE); Robert Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 15/935,108

(22) Filed: Mar. 26, 2018

(65) Prior Publication Data
US 2019/0294699 A1    Sep. 26, 2019

(51) Int. Cl.
  *G06F 16/16*      (2019.01)
  *G06F 16/176*    (2019.01)
  *G06F 16/13*      (2019.01)
  *G06F 16/182*    (2019.01)

(52) U.S. Cl.
  CPC ............ *G06F 16/176* (2019.01); *G06F 16/13* (2019.01); *G06F 16/16* (2019.01); *G06F 16/183* (2019.01)

(58) Field of Classification Search
  CPC ...... G06F 16/176; G06F 16/16; G06F 16/183; G06F 16/13
  USPC .................................................. 707/821–827
  See application file for complete search history.

(56) References Cited

U.S. PATENT DOCUMENTS

| | | | |
|---|---|---|---|
| 6,324,581 B1 * | 11/2001 | Xu .......................... | H04L 29/06 709/229 |
| 6,453,354 B1 * | 9/2002 | Jiang .................. | G06F 16/1774 709/229 |
| 7,685,177 B1 * | 3/2010 | Hagerstrom ........ | G06F 16/1744 707/999.204 |
| 8,965,938 B2 * | 2/2015 | Bhise .................... | G06F 16/113 707/822 |
| 9,053,341 B2 * | 6/2015 | Odnovorov ............ | H04L 9/088 |
| 9,256,630 B2 | 2/2016 | Jaquette | |
| 9,262,424 B1 * | 2/2016 | Si ......................... | G06F 11/1482 |
| 9,697,226 B1 * | 7/2017 | Youngworth ......... | G06F 3/0655 |
| 2001/0047292 A1 * | 11/2001 | Montoya ............ | G06Q 30/0203 705/7.32 |

(Continued)

OTHER PUBLICATIONS

Mell et al., "The NIST Definition of Cloud Computing," U.S. Department of Commerce, National Institute of Standards and Technology, Sep. 2011, p. 1-7, Special Publication 800-145.

(Continued)

*Primary Examiner* — Hanh B Thai
(74) *Attorney, Agent, or Firm* — L. Jeffrey Kelly

(57) ABSTRACT

A method, computer program product, and system for identifying an orphan file in a shared database, wherein an owner of the orphan file no longer has access to the shared database, identifying an orphan file in a shared database, where an owner of the orphan file no longer has access to the shared database, surveying a group of one or more users, where surveying comprises a request to vote among the group for a new owner of the orphan file, and assigning ownership permission to a new owner among the one or more users within the group based on a result of the survey.

18 Claims, 5 Drawing Sheets

(56) References Cited

U.S. PATENT DOCUMENTS

| | | | |
|---|---|---|---|
| 2002/0123924 A1* | 9/2002 | Cruz | G06Q 30/02 |
| | | | 705/7.24 |
| 2005/0251500 A1* | 11/2005 | Vahalia | G06F 16/1774 |
| 2008/0215370 A1* | 9/2008 | Dent | G06F 21/6245 |
| | | | 705/3 |
| 2011/0184989 A1* | 7/2011 | Faitelson | G06F 16/245 |
| | | | 707/784 |
| 2013/0055100 A1* | 2/2013 | Kondasani | G06F 16/9566 |
| | | | 715/739 |
| 2013/0060805 A1* | 3/2013 | Kondasani | G06F 16/958 |
| | | | 707/769 |
| 2013/0110660 A1* | 5/2013 | Yang | G06Q 30/02 |
| | | | 705/26.1 |
| 2013/0275429 A1 | 10/2013 | York et al. | |
| 2013/0304765 A1* | 11/2013 | Failelson | G06F 21/6218 |
| | | | 707/785 |
| 2014/0012814 A1* | 1/2014 | Bercovici | G06F 16/2379 |
| | | | 707/636 |
| 2014/0143381 A1* | 5/2014 | Gould | H04L 61/1511 |
| | | | 709/217 |
| 2015/0180914 A1* | 6/2015 | Welinder | G06F 11/2082 |
| | | | 715/758 |
| 2015/0180980 A1* | 6/2015 | Welinder | H04L 67/06 |
| | | | 715/758 |
| 2015/0312343 A1* | 10/2015 | Gunda | G06F 16/172 |
| | | | 707/827 |
| 2016/0070797 A1* | 3/2016 | Ionescu | G06F 16/13 |
| | | | 707/709 |
| 2017/0372339 A1* | 12/2017 | Davis | G06F 16/29 |
| 2018/0157521 A1* | 6/2018 | Arikatla | G06F 9/45558 |
| 2018/0157522 A1* | 6/2018 | Bafna | G06F 9/45558 |

OTHER PUBLICATIONS

Sileoni, "Design and Development of Software Solution to Improve Google Drive Shared Folders", Helsinki Metropolia University of Applied Sciences, Master's Degree, Information Technology, Master's Thesis, Nov. 23, 2015, pp. 1-57.

Smith, "By the Numbers: 17 Staggering Dropbox Statistics (May 2016)", DMR, Stats, Gadgets, Expanded Rambilings, Digital Stat Articles, Dropbox Stats, http://expandedramblings.com/index.php/dropbox-statistics/, May 2016, last updated Jul. 14, 2016, pp. 1-12.

Google, "Google Docs Help Forum", https://productforums.google.com/forum/#!topic/docs/2bnURTxpB1s, printed Jan. 12, 2018, pp. 1-3.

* cited by examiner

ORPHANED CONTENT REMEDIATION

BACKGROUND

The present invention relates generally to a method, system, and computer program product for data processing, and more particularly to a method, system, and computer program product for reassigning orphan data or content.

A shared database provides a synchronized storage location accessible by multiple users. A file owner may control access to a file and may allow additional users to each have read, write, and/or manager control of the file. As availability of "free" storage in online file stores, for example, Dropbox™ (Dropbox trademarks and logos are trademarks or registered trademarks of Dropbox, Inc. and/or its affiliates), Box.com™ (Box.com trademarks and logos are trademarks or registered trademarks of Box.com and/or its affiliates), and IBM® Connections™ Files (IBM and Connections trademarks and logos are trademarks or registered trademarks of International Business Machines Corporation and/or its affiliates), has exploded, so has the quick and effortless sharing of files. Dropbox™, for instance, has 1.2 billion files shared a day. A file may be a valuable reference used in a business or for personal use, and access to information in the file may be critical for the business or for personal use. Other programs or applications may require use of the file and may not be able to function properly, and the required file may need to be re-created.

A valuable reference or file may become or orphaned when an owner of the file no longer has access to the file, resulting in inconvenience, confusion, aggravation, and an increased workload to the people depending on the reference.

SUMMARY

Embodiments of the present invention disclose a method, computer program product, and system for identifying an orphan file in a shared database, wherein an owner of the orphan file no longer has access to the shared database, identifying an orphan file in a shared database, where an owner of the orphan file no longer has access to the shared database, surveying a group of one or more users, where surveying comprises a request to vote among the group for a new owner of the orphan file, and assigning ownership permission to a new owner among the one or more users within the group based on a result of the survey.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
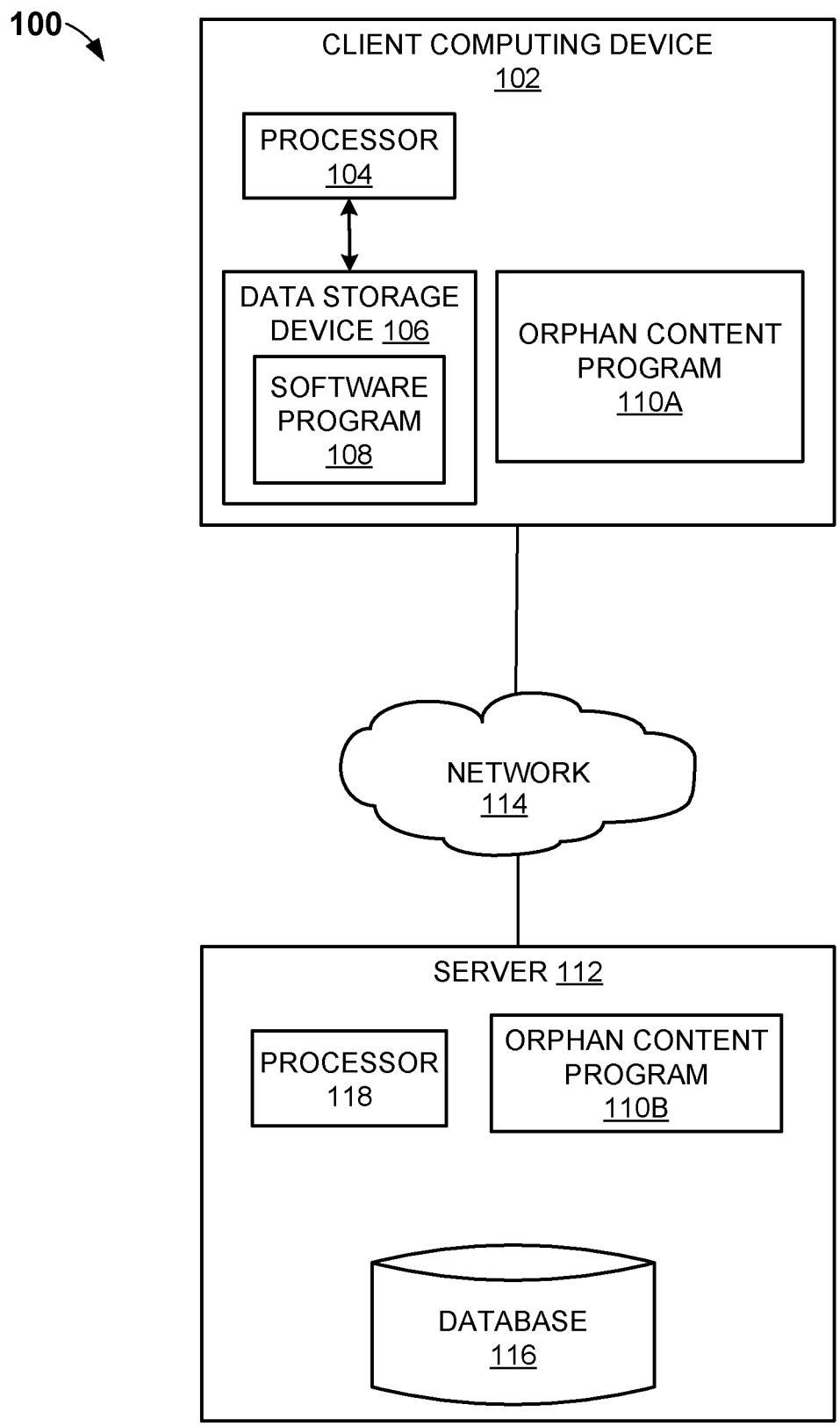
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention generally relates to data processing, and more particularly to reassigning orphan data or content. The following described exemplary embodiments provide a system, method, and program product to, among other things, identify and reassign an orphan file. Therefore, the present embodiment has the capacity to improve the technical field of data processing by providing a method to determine a new owner of the orphan file.

As previously described, a file in a shared database may have a file owner who controls access to the file and allows additional users of the shared database to each have read, write, and/or manager control of the file. The file may be a valuable reference used in a business or for personal use, and access to information in the file may be critical for the business or for personal use. Other programs or applications may require use of the file and may not be able to function properly, and the required file may need to be re-created. The file may become or orphaned when an owner of the file no longer has access to the file, resulting in inconvenience, confusion, aggravation, and an increased workload to the people depending on the reference.

One way to reassign an orphan file is to identify an orphan file, identify one or more potential new owners for the file, request each of the potential new owners to vote for a new owner, and reassign an owner to the file. An embodiment by which to identify an orphan file, identify one or more potential new owners for the file, and reassign an owner to the file is described in detail below by referring to the accompanying drawings in FIGS. 1 to 5. Those skilled in the art will readily appreciate that the detailed description given herein with respect to these figures is for explanatory purposes as the invention extends beyond these limited embodiments.

This method has benefits for identifying orphan content and proactively assigning a new owner to a file where the owner no longer has access to the file. This process can avoid potential downtimes and avoid wasted time for employees of a company whom need access to the file for work productively.

Referring now to FIG. 1, a functional block diagram illustrating a system 100 in a networked computer environment, in accordance with an embodiment of the present invention, is shown. The system 100 may include a client computing device 102 and a server 112. The client computing device 102 may communicate with the server 112 via a communications network 114 (hereinafter "network"). The client computing device 102 may include a processor 104, and a data storage device 106 that is enabled to host and run a software program 108 and an orphan content program 110A, and is enabled to interface with a user and communicate with the server 112. The server 112 may also include a processor 118 and a database 116 that is enabled to run an orphan content program 110B. In an embodiment, the client computing device 102 may operate as an input device including a user interface while the orphan content program 110B may run primarily on the server 112. In an alternative embodiment, the orphan content program 110A may run primarily on the client computing device 102 while the server 112 may be used for processing a storage of data used by the orphan content program 110B.

It should be noted, however, that processing for the orphan content program 110A,110B may, in some instances be shared amongst the client computing device 102 and the server 112 in any ratio. In another embodiment, the orphan content program 110A,110B may operate on more than one server 112, client computing device 102, or some combination of servers 112 and client computing devices 102, for example, a plurality of client computing devices 102 communicating across the network 114 with a single server 112.

The network 114 may include wired connections, wireless connections, fiber optic connections, or some combination thereof. In general, the network 114 can be any combination of connections and protocols that will support communications between the client computing device 102 and the server 112. The network 114 may include various types of networks, such as, for example, a local area network (LAN), a wide area network (WAN) such as the Internet, a telecommunication network, a wireless network, a public switched network and/or a satellite network.

In various embodiments, the client computing device 102 and/or the server 112 may be, for example, a laptop computer, tablet computer, netbook computer, personal computer (PC), a desktop computer, a personal digital assistant (PDA), a smart phone, a mobile device, or any programmable electronic device capable of communicating with the server 112 via the network 114. As described below with reference to FIG. 3, the client computing device 102 and the server 112 may each include internal and external components. In other embodiments, the server 112 may be implemented in a cloud computing environment, for example, cloud computing nodes 410, as described in relation to FIGS. 4 and 5 below. Similarly, the client computing device 102 may be implemented in the cloud computing environment, for example, laptop computer 440C as shown in FIG. 4.

In an embodiment, the system 100 may include any number of client computing devices 102 and/or servers 112; however only one of each is shown for illustrative purposes only. It may be appreciated that FIG. 1 provides only an illustration of an implementation and does not imply any limitations with regard to the environments in which different embodiments may be implemented. Many modifications to the depicted environments may be made based on design and implementation requirements.

According to an embodiment, the orphan content program 110A,110B may be generally configured to perform actions to identify an orphan file, or a file where a file owner no longer has access to the file, and determine a new owner for the file. For example, an employee is no longer employed by a company, and her access to a company owned database has been removed, and the files which she is an owner of no longer has a valid owner. The orphan content program method is described and explained in further detail below with reference to FIGS. 2-6.

Figure 2:
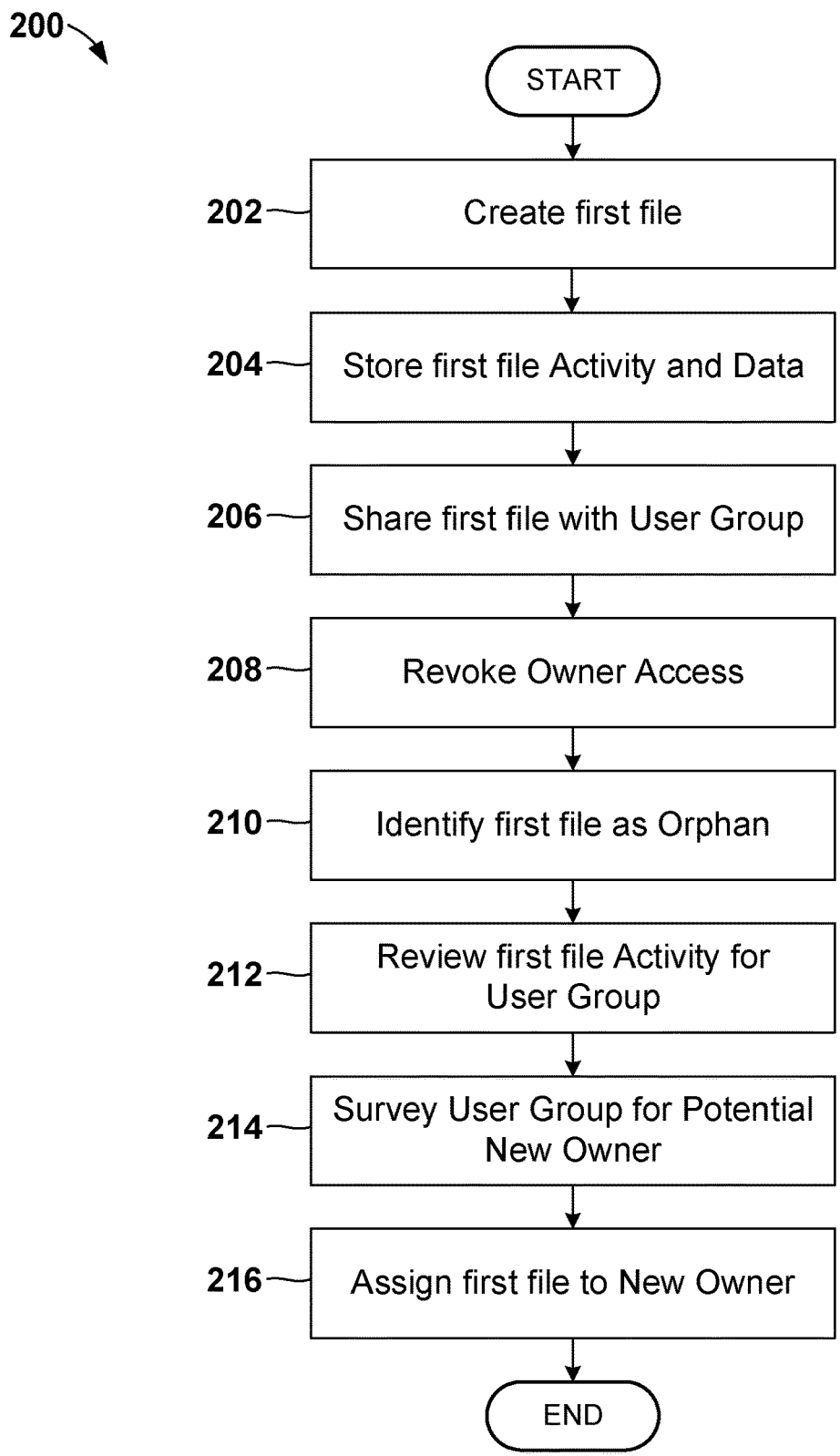
FIG. 2 is a flowchart depicting operational steps of an orphan content program within the data processing environment of FIG. 1, in accordance with an embodiment of the present invention.

Referring now to FIG. 2, and with continued reference to FIG. 1, a method flowchart 200 is shown in accordance with an embodiment of the present invention. The method flowchart 200 may be configured to identify an orphan file, or a file where a file owner no longer has access to the file, and determine a new owner for the file.

Beginning with step 202, a first file may be created. The first file may include data, a program, an image file, an audio file, or any other type of file. For example, data may include reference information or dynamically calculated data. The program may be an executable program. The first file may be created on a personal computer or a shared computer. The first file may be created by an owner or it may be created as an output by an executable program and assigned to the owner. The first file may be used by others. For example, pricing information may be used in an invoice. In another example, an image of a company logo may be displayed on a website. The owner of the first file can edit, rename, move, and modify the file. In an example, owner A creates a file 1 listing component cost markups per type of commodity, such as microprocessors, 10% markup, DRAM, 5% markup, and connectors, 3% markup. Furthermore, owner A creates a file 2 listing component part number, component costs and commodity type per component cost, for example, component 123, $5.00, connector; component 234, $6.00, DRAM, component 345, $7.00, microprocessor. Additionally, owner A creates a file 3 listing inventory per component part number, for example, component 123, 5,000 parts, component 234, 2,000 parts, component 345, 10,000 parts.

At step 204, the owner may store the first file on a shared database, such as the database 116. By definition, the shared database may allow more than one user to have access to a stored file. The owner may be a user of the shared database. The database may contain the first file data and activity of the first file, including a creation date, a data size, an owner userid, an edit date of the first file, among other data.

Next at step 206, the owner of the first file may allow a group of one or more users to have access to the first file. The group of one or more users are users of the shared database and have access to data and files in the database. The owner may specify an access type for each user of the group. The access type may be read only, read/write, shared ownership, among other access types. Continuing with the example above, the owner A may allow user B and user C to have read access to the file 1, and may allow user D to have write access to the file 1. The owner A may allow user B to have write access to the file 2, and may allow users C and D to have read access to the file 2. The owner A may allow users B, C, and D to have read access to the file 3.

At step 208, access to the database may be revoked for the owner of the first file. The access may be revoked for many different reasons, including a userid of the owner is no longer valid, credentials of the userid of the owner have expired, the userid of the owner has been deleted from a list of valid userids for the database. In an embodiment, the database may belong to a company and the owner of the first file may no longer be employed by the company, and their access to the database is removed. In an example, the userid of the owner A may be deleted by the owner herself.

At step 210, the first file may be identified as an orphan file as a result of the revocation of the owner access to the database. In order to identify orphan files, whenever access is removed from a userid, the orphan content program 110A,110B may perform a search of the database for any files which identify that userid as an owner. The group of the one or more users may continue to have access to the first file. Alternatively, there may be no additional users with access to the first file. Continuing with the example above, owner A no longer has access to the database. The userid B, C, and D continue to have the level of access previously set by the owner A.

Step 212 includes review of the file activity for the first file to identify a potential new owner of the first file. The file activity may include the type of access for each of the group of one or more users. The file activity may include a history of a group of prior users, whom may have had access to the first file in the past. The file activity may also include a group of incidental users to whom the file was forwarded to, or had any interaction with the first file. In the example above, the users B and C have read access to the file 1, and D to has write access to the file 1, user B has write access to the file 2, and users C and D have read access to the file 2, and users B, C, and D have read access to the file 3.

At step 214, a survey may be sent to the group of one or more users. The survey may indicate that the owner of first file no longer has access to the database and that a new owner for the first file must be assigned. The survey may identify the users in the group of one or more users, identify the type of access of each user in the group of one or more users, may show the first file activity, show access history, and other information. The survey may allow each user in the group to vote for the user who should be identified as the new owner of the first file. The survey may ask each user to vote for a new owner of the first file. Continuing with the example above, the survey may be sent to users B, C, and D.

In an embodiment, each user of the group may be asked and may confirm if they would like to be considered to be the new owner prior to the survey. In another embodiment, the user of the group of one or more users whom is selected as a result of the survey may confirm they can be assigned as the new owner after the survey selects them. In yet another embodiment, the survey of the group may assign a different weight to the vote of each user. The different weights may depend on a type of access for each user of the group of one or more users. For example, a user with shared ownership may have a vote given more weight than a user with read/write access, and a user with read/write access may have a vote given more weight than a user with read only access. In a further embodiment, a subset of the group may be part of the survey, where the subset comprises the users who have shared ownership of the first file. In another embodiment, a greater weight in the vote may be applied to a user of the group who has accessed the first file more frequently in a set number of previous days.

In an embodiment, the first file may be used by one or more programs, and the survey may be sent to owners of the one or more programs. In another embodiment, a new owner of the first file may not be part of the group of one or more users. In yet another embodiment, a greater weight in the vote may be applied to a user of the group who has accessed the first file more frequently in a set number of previous days.

In an embodiment, the group may not contain a current valid userid, and the survey may be sent to any user whom had any interaction with the first file in the past. For example, a user who the first file was emailed to, or a user who had access to the first file in the past. In an embodiment, if no potential new owner is identified, a last manager of the owner may be surveyed and asked to identify a new owner of the first file. Additionally, two copies of the first file may be created for two different users to each have their own version of the first file.

In an embodiment, the orphan content program 110A, 110B may identify possible outcomes of new ownership based on the file activity of the first file, and may populate the survey with the possible outcomes. The orphan content program 110A,110B may generate the possible outcomes based on meta data to better predict who the survey should be sent to. In a further embodiment, the orphan content program 110A,110B may make a choice of a new owner based on the file activity of the first file.

At step 216, a new owner may be assigned to the first file, as a result of the survey. In an embodiment, there may be more than one new owner if the survey results indicate the users of the group prefer to have more than one new owner. In an embodiment, if there are shared owners, any remaining shared owners may retain ownership and become the new owners of the first file. The new owner of the first file may control the first file, edit the first file, modify the group of users and change access levels or types of each user of the group of users.

Continuing with the example above, user D may become the new owner of the file 1, as this user was the only user with write access, after a vote, user C may become the new owner of the file 2, and based on more usage of the file 3, the user C may become the new owner of the file 3.

In an embodiment, the owner of the first file may be the owner of a group of files, and a survey with a vote may be conducted for each file of the group of files. Alternatively, a survey with a vote may be conducted for a sub-set of each file of the group of files, for example, all of the files in a particular memory folder may be reassigned based on a survey for that particular folder and the users who have access to that particular folder.

The method flowchart 200 allows identification of orphan content and allows assignment of a new owner to a file before a problem may arise such as downtime and uncertainty as to ownership of the orphan file or content.

Figure 3:
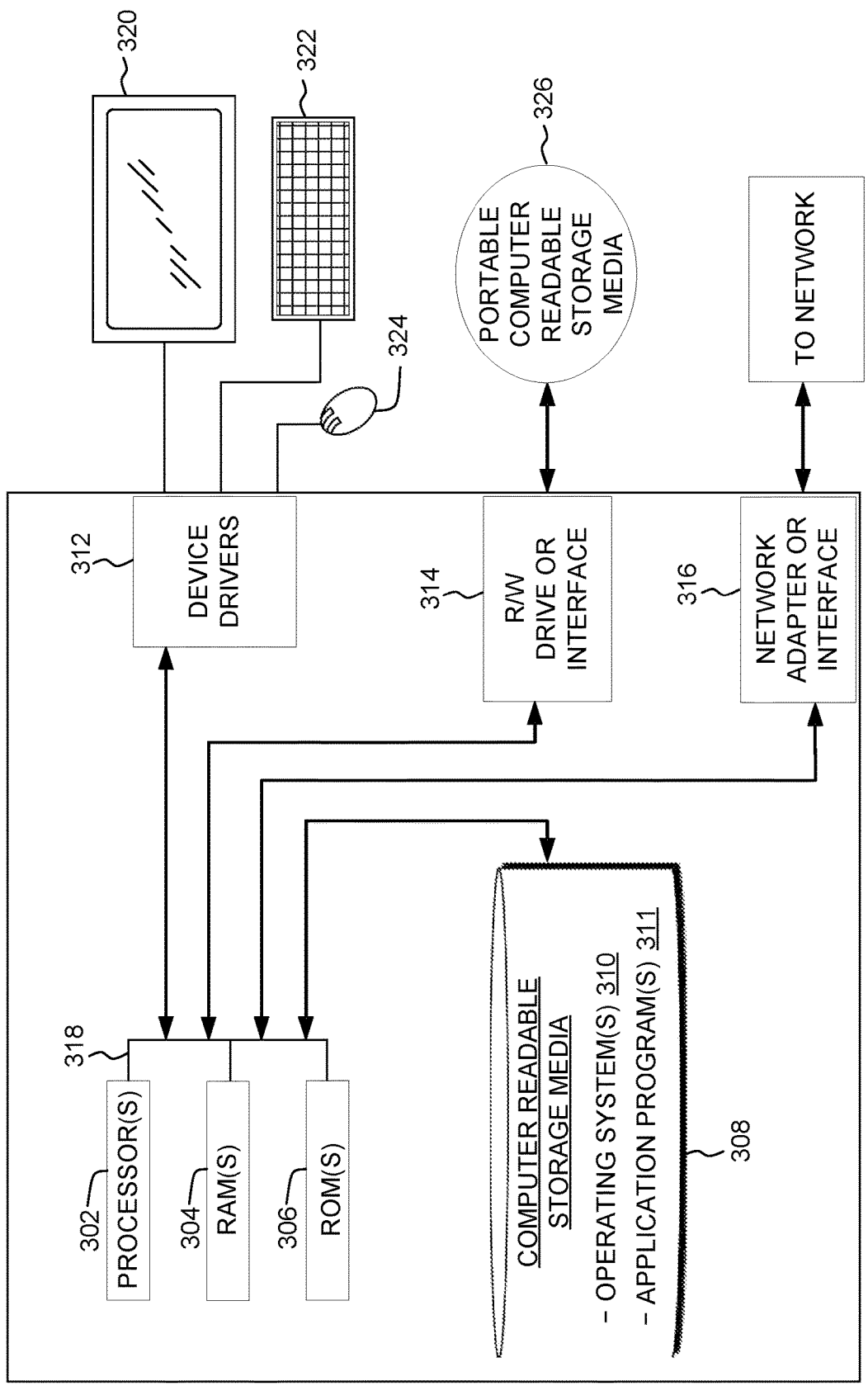
FIG. 3 is a block diagram of internal and external components of computers and servers depicted in FIG. 1, in accordance with an embodiment of the present invention.
Figure 4:
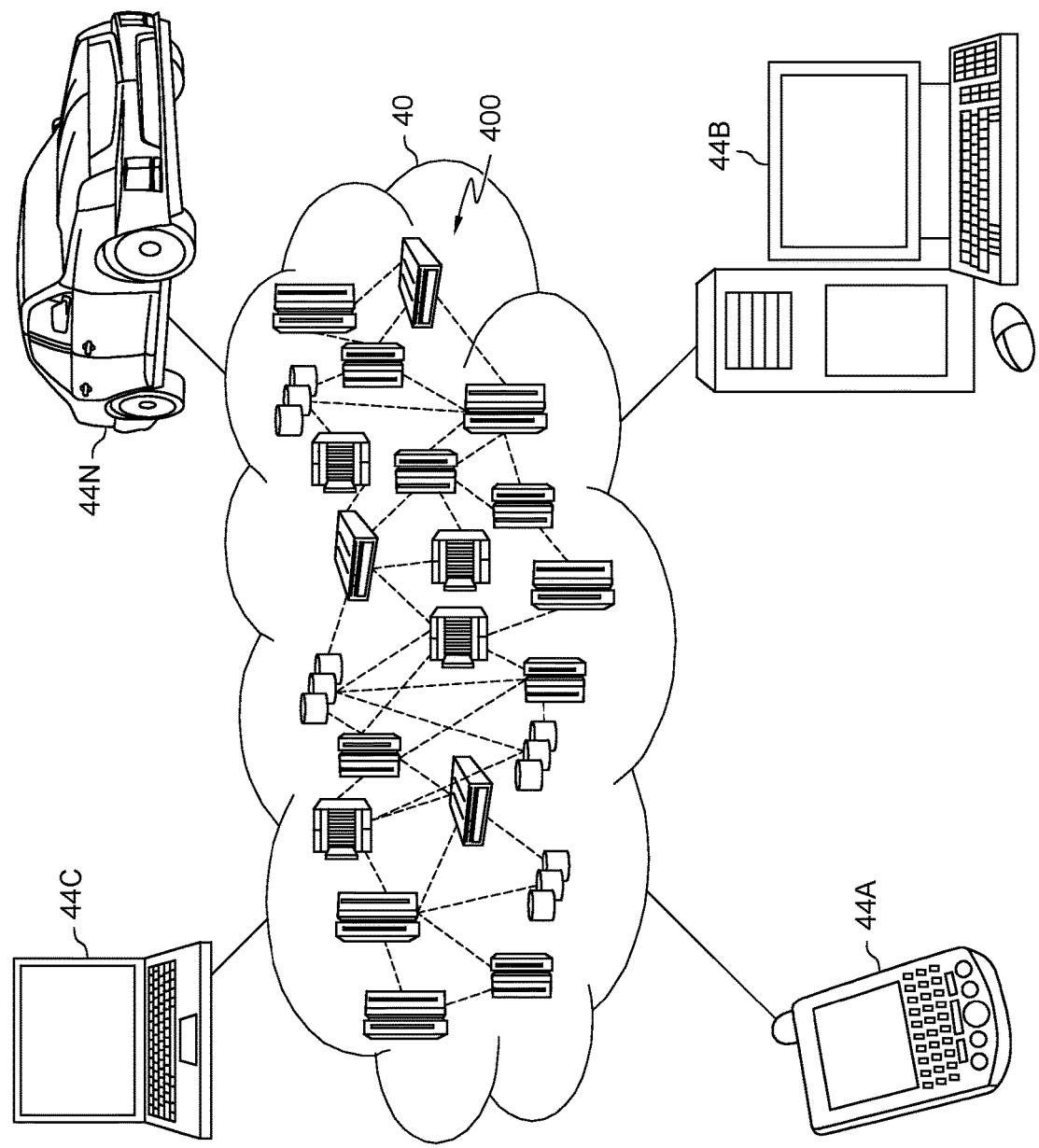
FIG. 4 is a block diagram of functional layers of an illustrative cloud computing environment, including the distributed data processing environment depicted in FIG. 1, in accordance with an embodiment of the present disclosure.

Referring now to FIG. 3, a block diagram of components of a computing device, such as the client computing device 102 or the server 112, of the system 100 of FIG. 1, in accordance with an embodiment of the present invention is shown. It should be appreciated that FIG. 3 provides only an illustration of an implementation and does not imply any limitations with regard to the environments in which different embodiments may be implemented. Many modifications to the depicted environment may be made.

The client computing device 102 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, orphan content program 110A,110B, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The client computing device 102 may also include a R/W drive or interface 314 to read from and write to one or more portable computer readable storage media 326. Application programs 311 on the client computing device 102 may be stored on one or more of the portable computer readable storage media 326, read via the respective R/W drive or interface 314 and loaded into the respective computer readable storage media 308.

The client computing device 102 may also include a network adapter or interface 316, such as a TCP/IP adapter card or wireless communication adapter (such as a 4G wireless communication adapter using OFDMA technology). Application programs 311 on the client computing device 102 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

The client computing device 102 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of cloud computing include on-demand self-service, broad network access, resource pooling, rapid elasticity, and measured service, which are each described below.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models include Software as a Service, Platform as a Service, and Infrastructure as a Service, which are each described below.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models include private cloud, community cloud, public cloud, and hybrid cloud, which are each described below.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440A, desktop computer 440B, laptop computer 440C, and/or automobile computer system 440N may communicate. Cloud computing nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 44A-N shown in FIG. 4 are intended to be illustrative only and that cloud computing nodes 410 and cloud computing environment 400 can communicate with any type of computerized device over any type of network and/or network addressable connection (e.g., using a web browser).

Figure 5:
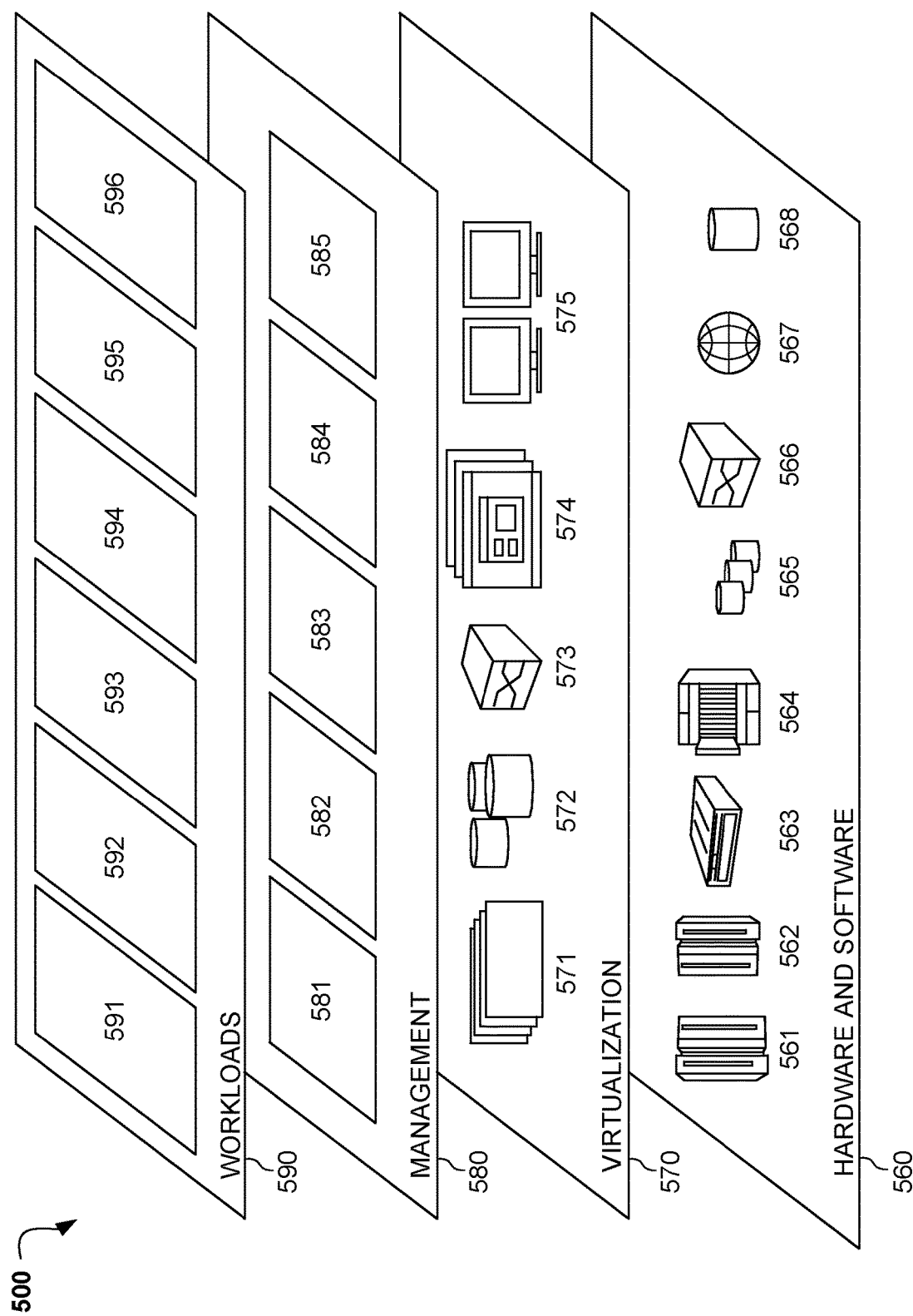
FIG. 5 is a functional block diagram of functional layers of the illustrative cloud computing environment of FIG. 4, in accordance with an embodiment of the present invention.

Referring now to FIG. 5, a set of functional abstraction layers provided by cloud computing environment 500 (as shown in FIG. 1) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572, for example the data storage device 106 as shown in FIG. 1; virtual networks 573, including virtual private networks; virtual applications and operating systems 574; and virtual clients 575.

In an example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and orphan content program 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for assigning a new owner to an orphan file in a shared database, the method comprising:
   receiving notification that access to the shared database has been revoked for a first user;
   searching the database for a first file owned by the first user, wherein the first file is an executable file;
   confirming the first file has no owner;
   searching a file history of the first file in meta data of the shared database for a first group of users with read/write access to the first file;
   searching the file history for a second group of users with read only access to the first file;

searching the file history for a third group of users, wherein each user of the third group of users has interacted with the first file;

searching the file history for a fourth group of users, wherein each user of the fourth group of users accessed the first file at some time in the past;

requesting votes for a new owner of the first file selected from the first group of users, wherein the votes are requested from each user of a combined group of users including the first group of users, the second group of users, the third group of users and the fourth group of users;

collecting the votes from each user of the combined group of users;

concurrently with the collecting, compiling the votes by:
applying a greater weight to a vote from a user of the first group of users based on a frequency of access to the first file in a set number of previous days, wherein a higher weight is applied to votes by users of the first group of users having a higher frequency of access to the first file;

applying a greater weight to votes from users of the first group of users than to votes from users of the second group of users based on user's level of access to the first file;

applying a greater weight to votes from users of the second group of users than to votes from users of the third group of users based on user interactions with the first file;

applying a greater weight to votes from users of the third group of users than to votes from users of the fourth group of users based on user's prior access of the first file; and assigning the new owner of the first file based on the compiling of votes.

2. The method according to claim 1, further comprising:
requesting votes for the new owner of the first file from each user of a fourth group of users of the first file, wherein the fourth group of users of the first file are owners of a set of executable programs which use the first file.

3. The method according to claim 1, further comprising:
confirming the new owner is willing to assume ownership of the first file.

4. The method according to claim 1, further comprising:
upon determining there is not a single winner of the voting, requesting the new owner from a most recent manager of the first user.

5. The method according to claim 1, wherein interaction with the first file comprises a user to whom the first file was forwarded to.

6. The method according to claim 1, wherein requesting votes for the new owner of the first file from the combined group of users comprises:
sending an email to each user of the combined group of users, wherein the email comprises a list of each user of the first group of users, an access type of each user of the first group of users and a first file activity of the first file for each user of the first group of users.

7. A computer program product for assigning a new owner to an orphan file in a shared database, the computer program product comprising:
one or more computer-readable storage media and program instructions stored on the one or more computer-readable storage media, the program instructions executable by a computing system to cause the computing system to perform a method comprising:

receiving notification that access to the shared database has been revoked for a first user;

searching the database for a first file owned by the first user, wherein the first file is an executable file;

confirming the first file has no owner;

searching a file history of the first file in meta data of the shared database for a first group of users with read/write access to the first file;

searching the file history for a second group of users with read only access to the first file;

searching the file history for a third group of users, wherein each user of the third group of users has interacted with the first file;

searching the file history for a fourth group of users, wherein each user of the fourth group of users accessed the first file at some time in the past;

requesting votes for a new owner of the first file selected from the first group of users, wherein the votes are requested from each user of a combined group of users including the first group of users, the second group of users, the third group of users and the fourth group of users;

collecting the votes from each user of the combined group of users;

concurrently with the collecting, compiling the votes by:
applying a greater weight to a vote from a user of the first group of users based on a frequency of access to the first file in a set number of previous days, wherein a higher weight is applied to votes by users of the first group of users having a higher frequency of access to the first file;

applying a greater weight to votes from users of the first group of users than to votes from users of the second group of users based on user's level of access to the first file;

applying a greater weight to votes from users of the second group of users than to votes from users of the third group of users based on user interactions with the first file;

applying a greater weight to votes from users of the third group of users than to votes from users of the fourth group of users based on user's prior access of the first file; and assigning the new owner of the first file based on the compiling of votes.

8. The computer program product according to claim 7, further comprising:
requesting votes for the new owner of the first file from each user of a fourth group of users of the first file, wherein the fourth group of users of the first file are owners of a set of executable programs which use the first file.

9. The computer program product according to claim 7, further comprising:
confirming the new owner is willing to assume ownership of the first file.

10. The computer program product according to claim 7, further comprising:
upon determining there is not a single winner of the voting, requesting the new owner from a most recent manager of the first user.

11. The computer program product according to claim 7, wherein interaction with the first file comprises a user to whom the first file was forwarded to.

12. The computer program product according to claim 7, wherein requesting votes for the new owner of the first file from the combined group of users comprises:

sending an email to each user of the combined group of users, wherein the email comprises a list of each user of the first group of users, an access type of each user of the first group of users and a first file activity of the first file for each user of the first group of users.

13. A computer system for assigning a new owner to an orphan file in a shared database, the computer system comprising:
one or more computer processors, one or more computer-readable storage media, and program instructions stored on the one or more of the computer-readable storage media for execution by at least one of the one or more processors, wherein the computer system is capable of performing a method comprising:
receiving notification that access to the shared database has been revoked for a first user;
searching the database for a first file owned by the first user, wherein the first file is an executable file;
confirming the first file has no owner;
searching a file history of the first file in meta data of the shared database for a first group of users with read/write access to the first file;
searching the file history for a second group of users with read only access to the first file;
searching the file history for a third group of users, wherein each user of the third group of users has interacted with the first file;
searching the file history for a fourth group of users, wherein each user of the fourth group of users accessed the first file at some time in the past;
requesting votes for a new owner of the first file selected from the first group of users, wherein the votes are requested from each user of a combined group of users including the first group of users, the second group of users, the third group of users and the fourth group of users;
collecting the votes from each user of the combined group of users;
concurrently with the collecting, compiling the votes by:
applying a greater weight to a vote from a user of the first group of users based on a frequency of access to the first file in a set number of previous days, wherein a higher weight is applied to votes by users of the first group of users having a higher frequency of access to the first file;
applying a greater weight to votes from users of the first group of users than to votes from users of the second group of users based on user's level of access to the first file;
applying a greater weight to votes from users of the second group of users than to votes from users of the third group of users based on user interactions with the first file;
applying a greater weight to votes from users of the third group of users than to votes from users of the fourth group of users based on user's prior access of the first file; and
assigning the new owner of the first file based on the compiling of votes.

14. The computer system according to claim 13, further comprising:
requesting votes for the new owner of the first file from each user of a fourth group of users of the first file, wherein the fourth group of users of the first file are owners of a set of executable programs which use the first file.

15. The computer system according to claim 13, further comprising:
confirming the new owner is willing to assume ownership of the first file.

16. The computer system according to claim 13, further comprising:
upon determining there is not a single winner of the voting, requesting the new owner from a most recent manager of the first user.

17. The computer system according to claim 13, wherein interaction with the first file comprises a user to whom the first file was forwarded to.

18. The computer system according to claim 13, wherein requesting a vote from the combined group of users comprises:
sending an email to each user of the combined group of users, wherein the email comprises a list of each user of the first group of users, an access type of each user of the first group of users and a first file activity of the first file for each user of the first group of users.

* * * * *